(12) United States Patent
Durand

(10) Patent No.: US 9,071,595 B2
(45) Date of Patent: Jun. 30, 2015

(54) CERTIFICATE VALIDITY CHECKING

(75) Inventor: Alain Durand, Rennes (FR)

(73) Assignee: THOMSON LICENSING, Issy les Moulineaux (FR)

(*) Notice: Subject to any disclaimer, the term of this patent is extended or adjusted under 35 U.S.C. 154(b) by 1225 days.

(21) Appl. No.: 11/579,010

(22) PCT Filed: Apr. 22, 2005

(86) PCT No.: PCT/EP2005/051798
§ 371 (c)(1),
(2), (4) Date: Oct. 30, 2006

(87) PCT Pub. No.: WO2005/106616
PCT Pub. Date: Nov. 10, 2005

(65) Prior Publication Data
US 2007/0186111 A1    Aug. 9, 2007

(30) Foreign Application Priority Data
May 3, 2004    (EP) .................... 04291123

(51) Int. Cl.
*H04L 29/06*    (2006.01)
*H04N 21/266*    (2011.01)
(Continued)

(52) U.S. Cl.
CPC .......... *H04L 63/0823* (2013.01); *H04L 63/045* (2013.01); *H04L 63/065* (2013.01); *H04L 2463/062* (2013.01); *H04N 21/26606* (2013.01);
(Continued)

(58) Field of Classification Search
CPC . H04L 63/0823; H04L 63/045; H04L 63/065; H04L 9/3268; H04L 2463/062; H04L 2209/60; H04N 21/26606; H04N 21/4405

USPC .......... 380/200, 201, 203, 210, 239; 713/155, 713/156, 157, 158, 172, 173, 175; 726/10, 726/26, 27, 30
See application file for complete search history.

(56) References Cited

U.S. PATENT DOCUMENTS 5,515,439 A * 5/1996 Bantz et al. .................... 713/156
6,216,231 B1 * 4/2001 Stubblebine .................... 726/10
(Continued)

FOREIGN PATENT DOCUMENTS

EP    0715246    6/1996
EP    1253762    10/2002
(Continued)

OTHER PUBLICATIONS

Popescu et al., A DRM Security Architecture for Home Networks, 2004, in DRM '04: Proceedings of the 4th ACM workshop on Digital rights management, ACM Press.*
(Continued)

*Primary Examiner* — Eleni Shiferaw
*Assistant Examiner* — Hilary Branske
(74) *Attorney, Agent, or Firm* — Robert D. Sheed; Jeffrey M. Navon

(57) ABSTRACT

A method for checking a validity of a certificate (600) containing a key associated to a network device (601) in a network, comprises receiving at the network an encrypted content (611) and a validity index (630) associated to the content. The validity of the certificate is evaluated from a time index (606) contained within the certificate, the time index having a value corresponding to a time of issue of the certificate, and from the validity index associated to the encrypted content.

19 Claims, 11 Drawing Sheets

(51) Int. Cl.
*H04N 21/4405* (2011.01)
*H04L 9/32* (2006.01)

(52) U.S. Cl.
CPC .......... *H04N 21/4405* (2013.01); *H04L 9/3268* (2013.01); *H04L 2209/60* (2013.01)

(56) References Cited

U.S. PATENT DOCUMENTS

| | | | |
|---|---|---|---|
| 6,301,658 B1 * | 10/2001 | Koehler | 713/155 |
| 6,757,824 B1 | 6/2004 | England | |
| 6,971,008 B2 * | 11/2005 | Wasilewski et al. | 713/168 |
| 2001/0016838 A1 * | 8/2001 | Landrock | 705/80 |
| 2002/0106081 A1 | 8/2002 | Yang | |
| 2002/0152173 A1 * | 10/2002 | Rudd | 705/57 |
| 2003/0108206 A1 | 6/2003 | Diehl et al. | |
| 2004/0078066 A1 * | 4/2004 | Ohta et al. | 607/60 |
| 2004/0187014 A1 * | 9/2004 | Molaro | 713/200 |
| 2005/0084108 A1 | 4/2005 | Durand et al. | |
| 2005/0198510 A1 * | 9/2005 | Robert et al. | 713/175 |
| 2005/0220304 A1 * | 10/2005 | Lenoir et al. | 380/255 |
| 2005/0257260 A1 * | 11/2005 | Lenoir et al. | 726/21 |
| 2006/0020784 A1 * | 1/2006 | Jonker et al. | 713/157 |

FOREIGN PATENT DOCUMENTS

| | | | |
|---|---|---|---|
| EP | 1357456 | 10/2003 | |
| FR | 2836608 | 8/2003 | |
| JP | 2003008566 | 1/2003 | |
| JP | 2004504648 | 2/2004 | |
| RU | 2147790 | 4/2000 | |
| WO | WO9608092 | 3/1996 | |
| WO | WO 03058948 A2 * | 7/2003 | |
| WO | WO 2004/027588 | 4/2004 | |
| WO | WO 2004038568 A2 * | 5/2004 | G06F 1/00 |

OTHER PUBLICATIONS

Thomson: "Smartright Technical White Paper", Online, Jan. 28, 2003 pp. 1-19.
Lotspiech: "Broadcast encryption's bright future", Computer IEEE, Online, vol. 35, No. 8, Aug. 1, 2002, pp. 57-63.
"IBM Response to DVB-CPT Call for Proposals for Content Protection & Copy Management: XCP Cluster Protocol", Oct. 19, 2001, pp. 1-32.
Search Report Dated July 15, 2005.
ITU-T-X.509, The Directory: Authentication framework—Aug. 1, 1997.

* cited by examiner

CERTIFICATE VALIDITY CHECKING

This application claims the benefit, under 35 U.S.C. §365 of International Application PCT/EP05/051798, filed Apr. 22, 2005, which was published in accordance with PCT Article 21(2) on Nov. 10, 2005 in English and which claims the benefit of European patent application No. 04291123, filed on May 3, 2004.

BACKGROUND OF INVENTION

1. Field of the Invention

The invention relates generally to the field of secure communication networks.

2. Background Art

Data exchanged through a network may be copied. Hardware manufacturers hence need to protect the exchanged data and to manage permissions or prohibitions to copy the data. Typically, a Public Key Infrastructure (PKI) is provided: a trusted third party, e.g. a certifying authority, generates private/public keys pairs. The private/public keys pairs are involved in data exchanges between network devices of the network.

The trusted third party signs certificates that contain the public key of the private/public keys pair. Typically, each network device of the network is associated to a determined certificate. The determined certificate may for example be stored within a portable security module of the associated network device. The certificates allow to insure that the data is exchanged between network devices of the network only.

FIG. 1 illustrates an example of a certificate from Prior Art. The certificate 100 is generated by a certifying authority. The certificate 100 comprises an information portion 101 and a signature portion 102.

The information portion 101 comprises at least a public key PUB in a public key field 103, and an identifying field 104 of an associated network device, thus allowing to guarantee that the public key PUB is attached to the associated network device. The information portion 101 further comprises a standard field 105 indicating a standard of the certificate 100 and a validity field 106 that comprises a first date and a second date defining a time interval during which the certificate 100 is valid.

The signature portion 102 is generated from the information portion 101. The certifying authority applies to a content of the information portion 101 a hash function that allows to provide a mark of the content. The mark is subsequently encrypted with a certifying authority private key and the encrypted mark is stored within the signature portion 102.

When an authorized device intends to communicate with the network device, the authorized device checks a validity and an integrity of the certificate 100.

The validity of the certificate 100 is checked from the first date and the second date of the validity field 106.

If the certificate 100 is evaluated as valid, the authorized device subsequently applies the hash function to the content of the information portion 101 of the certificate 100 of the network device. The authorized device decrypts the signature portion 102 with a certifying authority public key associated to the certifying authority private key.

If the hashed content and the decrypted signature portion are similar, the public key of the network device is considered as regular.

A hacker may succeed in replacing a regular public key of a network device by a hacker key. In such a case, the certificate associated to the network device allows to identify the hacker key as fake. Any communication with the network device may subsequently be forbidden.

European Patent application EP 1 253 762, to Thomson Licensing SA, published Oct. 30, 2002, describes an example of a secure communication network involving certificates.

FIG. 2 illustrates an example of a secure communication network as described in the European Patent application EP 1 253 762. The illustrated communication network complies with the SmartRight standard.

A content receiver 201 transmits data to at least one terminal device (221a, 221b). If, for a single content receiver 201, a plurality of terminal devices (221a, 221b) is provided, the terminal devices (221a, 221b) form a local network 222.

Each terminal device (221a, 221b) of the local network 222 comprises a public key PUB certified by a trusted third party, e.g. a certifying authority (not represented). The public key PUB is stored in a certificate (202a, 202b) associated to the terminal device (221a, 221b).

The content receiver 201 receives an encrypted content CW(data) from a content provider. The encrypted data CW(data) are subsequently transmitted to the terminal devices (221a, 221b) of the local network 222.

The received content may be a pay television program. The content provider 206 may be a broadcaster, e.g. a satellite broadcaster. Each terminal device (221a, 221b) typically comprises a content presentation device (216a, 216b), e.g. a television set, and a portable security module (220a, 220b), e.g. a smartcard.

The encrypted content CW(data) is broadcast in a data stream F. The data stream F further comprises an Entitlement Control Message (ECM) that contains an encoded Control Word K(CW). The Control Word CW allows to decrypt the encrypted content CW(data). A plurality of keys are involved in a descrambling of the encrypted content CW(data) and the certificates (202a, 202b) are used to obtain some of the keys.

Typically, when a new network device is installed in the local network, the associated certificate allows to access a symmetric network key Kn. The symmetric network key is subsequently used to communicate a newly generated symmetric key Kc and the certificates are involved in the communicating. Furthermore, a validity of the certificate may be checked to allow the associated terminal device to decrypt the encrypted content.

FIG. 3 contains a time chart illustrating a communicating of a symmetric network key between a progenitor terminal device and a new terminal device at an installing of the new terminal device within a local network, according to the European Patent application EP 1 253 762.

A progenitor terminal device 321a possesses a symmetric network key Kn. When a new terminal device 321b is installed in a local network, the progenitor terminal device 321a reads a certificate 302b associated to the new terminal device 321b. A content of an information portion 303b and a content of a signature portion 304b are processed so as to evaluate if a public key PUB is properly associated to the new terminal device 321b. A validity of the certificate is also checked from a validity field 312b of the certificate 302b.

The new terminal device 321b transmits to the progenitor device 321a the public key PUB stored in the certificate 302b. The progenitor device 321a receives the transmitted public key PUB and encrypts a symmetric network key Kn with the received public key PUB. The encrypted symmetric network key PUB(Kn) is subsequently transmitted to the new terminal device 321b. A private key PRI stored in the new terminal device 321b allows to decrypt the encrypted symmetric network key PUB(Kn).

The symmetric network key Kn is used for exchanging data with the terminal devices (321a, 321b) of the local network.

Referring now to FIG. 2, the content receiver 201 receives the data stream F from the content provider 206. The data stream F comprises the encrypted content CW(data) and an Entitlement Control Message (ECM). The ECM comprises the encoded Control Word K(CW) itself, the Control Word CW being encoded by a key K.

The content receiver 201 comprises a decoder 217 and a receiver portable security module 218, e.g. a smartcard The content receiver 201 allows to decode and to re-encode the received Control Word CW, the Control Word CW being re-encoded with a symmetric key Kc. The encrypted data CW(data) and the re-encoded Control Word Kc(CW) are transmitted to at least one terminal device (221a, 221b).

The symmetric key Kc is preferably periodically renewed, for example on initiating each data transmission.

FIG. 4 schematically illustrates an example of a scrambled symmetric key Kn(Kc) acquisition from Prior Art A content receiver 401 checks to see if a certificate 402 guaranties that a public key PUB associated to a terminal device 421 is regular. A validity of the certificate 402 is also checked from a validity field 405 of the certificate 402.

The content receiver 401 subsequently transmits a new symmetric key Kc to the terminal device 421, the transmitted symmetric key Kc being scrambled with the public key PUB. The terminal device 421 descrambles the scrambled symmetric key Kc with an associated private key PRI stored in the terminal device 421. The terminal device 421 subsequently re-scrambles the symmetric key Kc with a symmetric network key Kn. The content receiver 401 receives from the terminal device 421 the re-scrambled symmetric key Kn(Kc). The symmetric key Kc is stored within the content receiver 401 in its scrambled form Kn(Kc).

Referring now to FIG. 2, the content receiver 201 possesses the symmetric key Kc in its scrambled form Kn(Kc) following the acquisition.

The content receiver 201 transmits to the terminal devices (221a, 221b) the scrambled symmetric key Kn(Kc) and the processed data stream, i.e. the encrypted content CW(data) and the re-encoded Control Word Kc(CW).

Each terminal device (221a, 221b) may subsequently descramble the symmetric key Kn(Kc) with the symmetric network key Kn. The symmetric key Kc allows to decode the re-encoded Control Word Kc(CW), and hence to decrypt the encrypted content CW(data). A validity of each certificate (202a, 202b) is checked before allowing any decrypting of the received content.

However, a hacker could perhaps succeed in obtaining the public key and insert unauthorized terminal devices into the local network.

In order to improve security in prior art systems, the public key may be replaced by a key having a bigger size so as to reinforce an encryption: for example, a 1024 bits RSA algorithm may be replaced by a 2048 bits RSA algorithm. An encryption algorithm or a standard of the certificate may also be updated, e.g. the RSA algorithm is replaced by a more secure cryptography algorithm. The certificates are hence periodically updated, e.g. once a year.

The validity of a determined certificate may be checked several times, e.g. at an installing of a new terminal device into the secure communication network, or when a new symmetric key Kc is generated and transmitted to the terminal device, as illustrated in FIG. 4. A continuous checking of the validity may be also performed, so as to insure that an owner of the terminal device is allowed to access the received content.

FIG. 5 illustrates an example of a system for checking a validity of a certificate from prior art. The certificate 500 may comply with the X509 standard and comprise a validity field 506 that stipulates from which starting date to which end date the certificate 500 may be considered as valid. Accordingly, the validity field 506 contains a first date 508 and a second date 509 that form a time interval during which the certificate 500 may be considered as valid.

Processing means 510 of an associated terminal device 521 allow to compare the first date 508 and the second date 509 of the certificate 500 to a current date furnished by a clock 507 so as to evaluate a validity of the certificate 500.

If the current date belongs to the time interval defined by the first date and the second date, the certificate 500 is considered as valid: the public key PUB of the certificate 202 may be accessed, thus indirectly allowing to decrypt a received encrypted content 511.

If the current date is outside the time interval, it is considered that the certificate 500 has expired, or that the certificate 500 is not valid yet.

In a case of a pay television system, the certificate 500 may be periodically updated or replaced. If a subscriber stops paying a rental, the certificate 500 is not replaced and the content terminal 521 is no longer able to decrypt the received encrypted content 511.

The validity of a given certificate may also be evaluated via a Certificate revocation List (CRL) that comprises revoked certificates or identifiers of the revoked certificates. A certificate of a terminal device is considered as valid as long as it is not mentioned within the CRL. If a hacker succeeds in obtaining a determined certificate, a trusted third party append the determined certificate to the latest CRL.

Typically, the validity of a certificate is evaluated following a two-steps procedure: both a validity field of the certificate and a CRL are involved in the evaluating. The validity field comprises a first date and a second date forming a time interval during which the certificate is expected to be valid. However, if a hacker succeeds in accessing a protected content, the certificate may be disabled sooner than expected: a new CRL is generated, the new CRL comprising an identifier of the disabled certificate. The disabled certificate is hence evaluated as valid at a first step of the evaluating, the first step involving only the validity field; at a second step of the evaluating, an identifier of the disabled certificate is found among the revoked certificate identifiers of the CRL and the disabled certificate is definitely evaluated as invalid.

SUMMARY OF INVENTION

In a first aspect the invention provides a method for checking a validity of a certificate containing a key associated to a network device in a network. The method comprises receiving at the network an encrypted content and a validity index associated to the content. The validity of the certificate is evaluated using a time index contained within the certificate and the validity index associated to the encrypted content. The time index has a value corresponding to a time of issue of the certificate.

In a first preferred embodiment, the validity index is received together with the associated content.

In a second preferred embodiment, the validity index is received in an encrypted form. The encrypted validity index is decrypted at the network.

In a third preferred embodiment, the validity index is integrity protected.

In a fourth preferred embodiment, the certificate is evaluated as invalid if the validity index is greater than the time index.

In a fifth preferred embodiment, a validity interval is derived from the time index. The certificate is evaluated as invalid if the validity index is outside the derived validity interval.

In a sixth preferred embodiment, the method further comprises updating a comparison index using the received validity index. The comparison index is stored within a determined network device of the network. The updated comparison index is compared to the time index to evaluate the validity of the associated certificate.

In a seventh preferred embodiment, the evaluating is performed when a new network device is installed within the network.

In an eighth preferred embodiment, the received encrypted content is decrypted at the network if the certificate is evaluated as valid from the time index and the validity index associated to the encrypted content.

In a ninth preferred embodiment, the method further comprises receiving at a content receiver of the network the encrypted content and the associated validity index. The received encrypted content and the associated validity index are transmitted to at least one terminal device of the network.

In a tenth preferred embodiment, the method further comprises receiving at the content receiver an Entitlement Control Message associated to the encrypted content. The Entitlement Control Message comprises an encoded Control Word, the Control Word allowing to decrypt the encrypted content The received Control Word is decoded at the content receiver and subsequently re-encoded with a symmetric key. The re-encoded control word is transmitted to the at least one terminal device.

In an eleventh preferred embodiment, the symmetric key is periodically renewed at the content receiver. The new symmetric key is scrambled with a public key and transmitted to at the least one terminal device. The scrambled symmetric key is descrambled at the at least one terminal device using a private key corresponding to the public key. The descrambled symmetric key is scrambled with a symmetric network key and subsequently transmitted to the content receiver. The scrambled symmetric key is stored into the content receiver. The method further comprises transmitting the scrambled symmetric key with the re-encoded Control Word, from the content receiver to at least one terminal device. The re-encoded Control Word is decoded with the symmetric key at the terminal device if the certificate associated to the terminal device is evaluated as valid. The encrypted content is decrypted with the decoded Control Word.

Preferably the encrypted content is an encrypted pay television program.

In a second aspect the invention provides a system for checking a validity of a certificate associated to a network device of a network. The system comprises at least one content receiver of the network, the content receiver allowing to receive from at least one content provider an encrypted content and a validity index associated to the content. Evaluating means allow to evaluate the validity of the certificate from a time index of the certificate, the time index having a value corresponding to a time of issue of the certificate, and from the validity index associated to the encrypted content.

In a twelfth preferred embodiment, the validity index is received in an encrypted form. The system further comprises decrypting means to decrypt the encrypted validity index.

In a thirteenth preferred embodiment, the system further comprises at least one terminal device of the network. Each terminal device is associated to one certificate.

In a fourteenth preferred embodiment, each terminal device comprises a content presentation device and a portable security module attached to the content presentation device. The certificate associated to the terminal device is stored within the portable security module.

In a fifteenth preferred embodiment, the content receiver also receives an encoded Control Word. The content receiver comprises a decoder to receive the encrypted content, and a receiver portable security module attached to the decoder to process the received encoded Control Word.

In a sixteenth preferred embodiment, the SmartRight environment is used.

Preferably the content provider is a broadcaster of pay television programs.

Preferably each content presentation device is a television set.

Other aspects and advantages of the invention will be apparent from the following description and the appended claims.

DETAILED DESCRIPTION

Data exchanged through a secure communication network may be protected from copy with secure systems involving a private/public keys pair. The public key is typically enclosed within a certificate that is associated to a terminal device so as to allow the terminal device to access a received content.

The certificates are regularly updated or replaced. A validity of a given certificate may be checked by comparing a current date provided by a clock to a first date and a second date of a validity field of the certificate.

However, some terminal devices, in particular consumer electronic devices, fail to comprise a clock. As a remedy, a first method and a second method allow to check the validity of the certificate as follows:

In the first method, the current date is given by a distinct network comprising a network clock;

In the second method, an external source is used as a clock.

Both the first method and the second method require strong authentication mechanisms to prevent attacks at a transmitting of the current date. Such authentication mechanisms may be relatively expensive.

Furthermore, in a case of a terminal device comprising a clock, a hacker may act on the clock to provide an erroneous value of the current time, e.g. by reducing a power supply of the terminal device. In a case of a terminal device having a user interface, the hacker may change the value of the current time provided by the clock very easily so as to consider a revoked certificate as valid.

A clock involved in an evaluating of a validity of a certificate hence needs to be secured, which may also be relatively expensive.

There is a need for a system allowing to check a validity of a certificate without any clock management.

Figure 1:
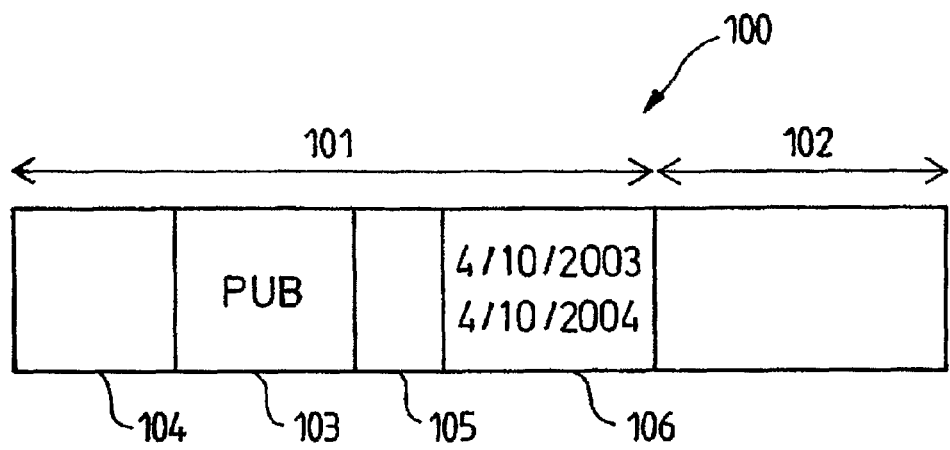
FIG. 1 illustrates an example of a certificate from Prior Art.
Figure 2:
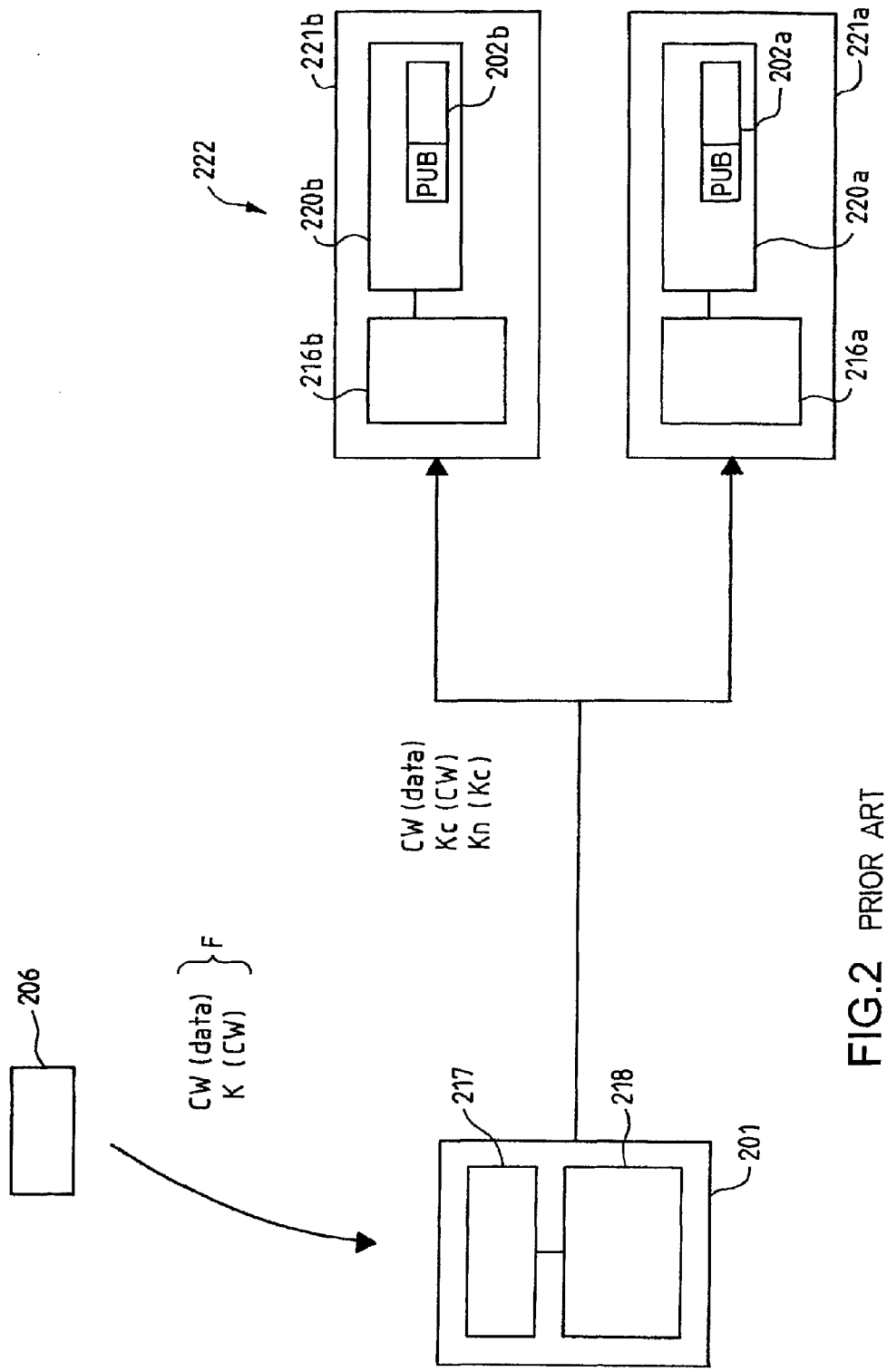
FIG. 2 illustrates an example of a secure communication network as described in the European Patent application EP 1 253 762.
Figure 3:
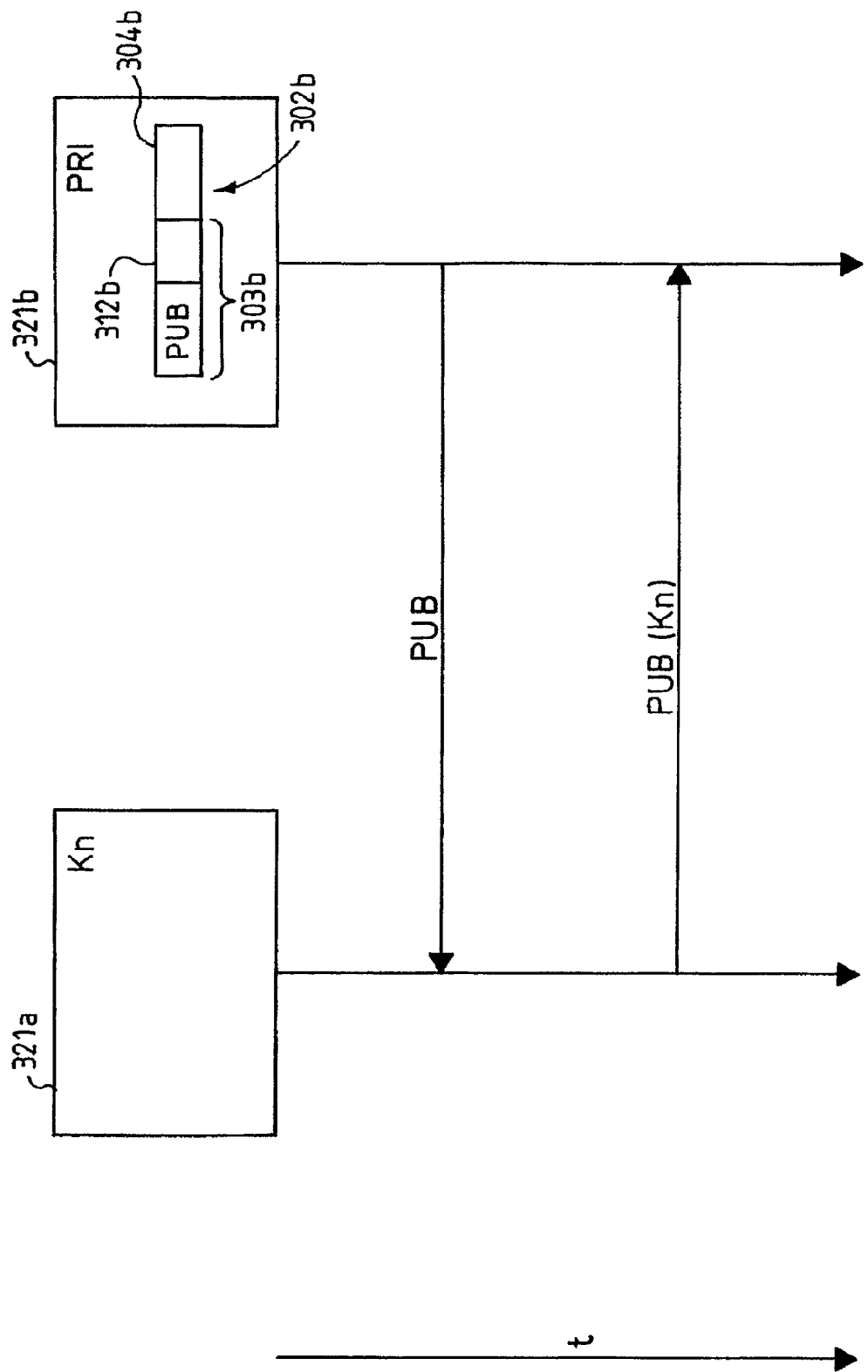
FIG. 3 contains a time chart illustrating a communicating of a symmetric network key between a progenitor terminal device and a new terminal device at an installing of the new terminal device within a local network, according to the European Patent application EP 1 253 762.
Figure 4:
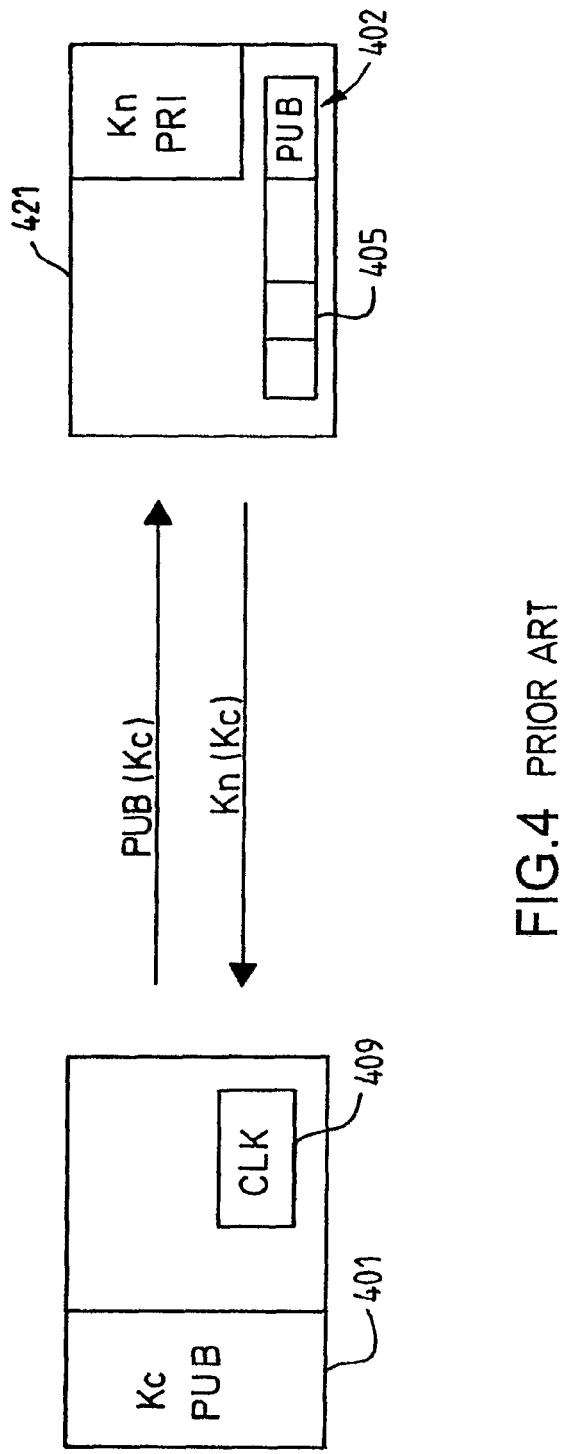
FIG. 4 schematically illustrates an example of a scrambled symmetric key Kn(Kc) acquisition from Prior Art.
Figure 5:
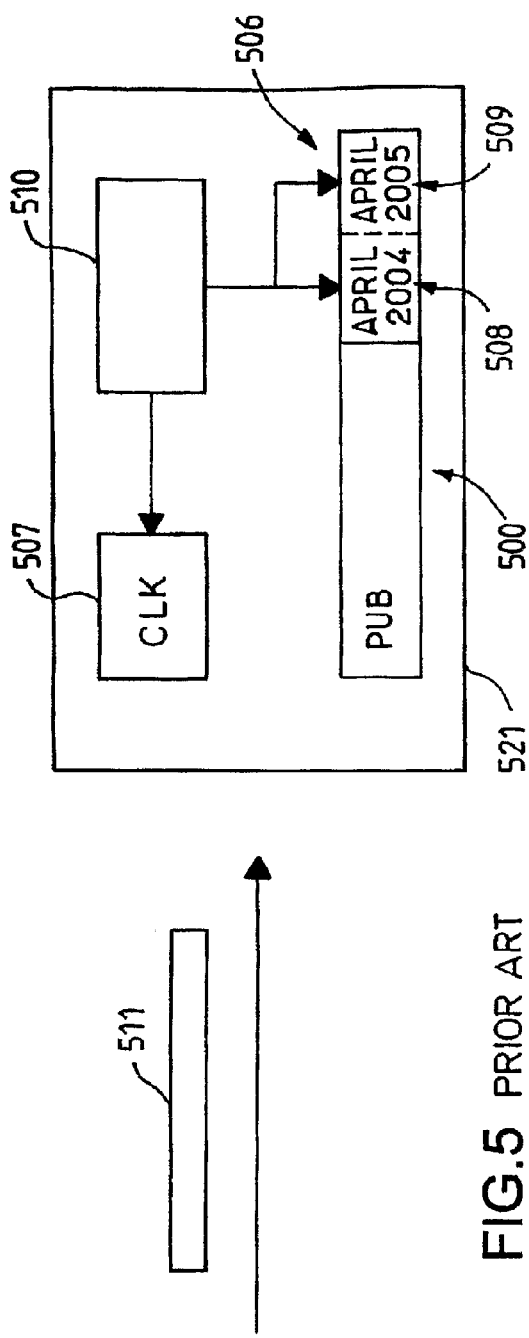
FIG. 5 illustrates an example of a system for checking a validity of a certificate from prior art.
Figure 6:
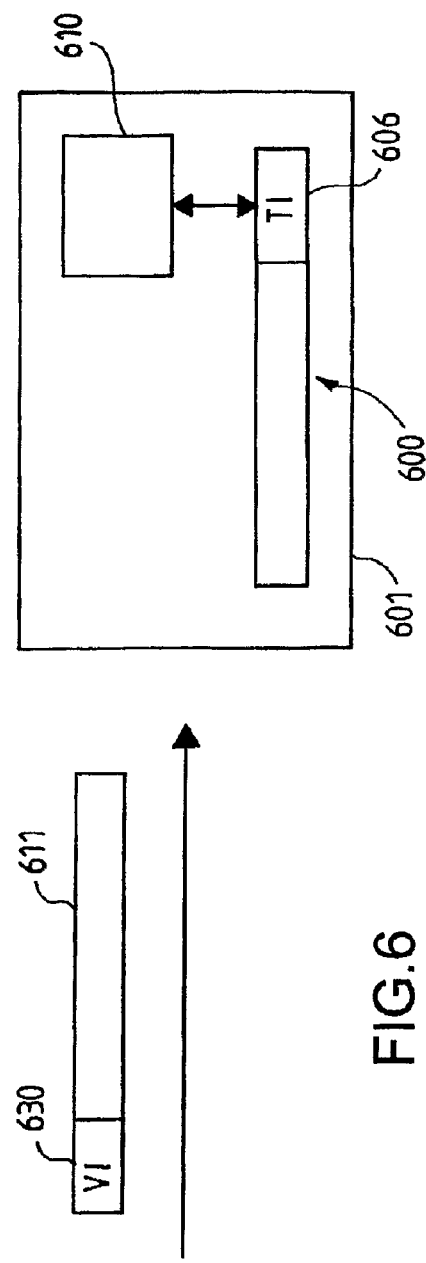
FIG. 6 illustrates an example of a system for checking a validity of a certificate, according to the present invention.

FIG. 6 illustrates an example of a system for checking a validity of a certificate, according to the present invention. The system allows to check a validity of a certificate 600. The certificate 600 is associated to a network device 601 of a network.

The system comprises at least one content receiver 601 to receive from at least one content provider (not represented on FIG. 6) an encrypted content 611 and a validity index 630 associated to the encrypted content 611.

The system further comprises evaluating means 610. The evaluating means 610 allow to evaluate the validity of the certificate 600 from a time index 606 of the certificate 600 and from the received validity index 630. The time index 606 has a value corresponding to a time of issue of the certificate 600.

Unlike the systems from prior art, the system of the present invention allows to check the validity of the certificate without any clock.

Furthermore, the systems from prior art comprise certificates with a validity field indicating from which starting date to which end date the certificate may be considered as valid. Such systems require to replace the certificates when the end date expires. In the method of the present invention, the certificate has a validity that is relative to a received content. As long as no hacker succeeds in accessing the received content, the validity index may keep a same value, thus allowing to postpone a replacing of the certificate and the associated cost.

On the contrary, if a content encrypting turns out to be weaker than expected, the validity indices may be replaced by new validity indices having a higher value. The certificates are hence evaluated as invalid, i.e. the system no longer allows to decrypt the received encrypted contents. Certificate's owners are thus urged to replace their certificates. This latter case is particularly well-adapted in a pay television system. The systems from prior art fail to encourage a certificate's owner to replace its certificate before the expiring of the end date since the certificate's owner already access the received content.

The evaluating means 610 may be part of the content receiver 601, as represented in FIG. 6. Alternatively, the evaluating means are part of a terminal device communicating with the content receiver.

Figure 7:
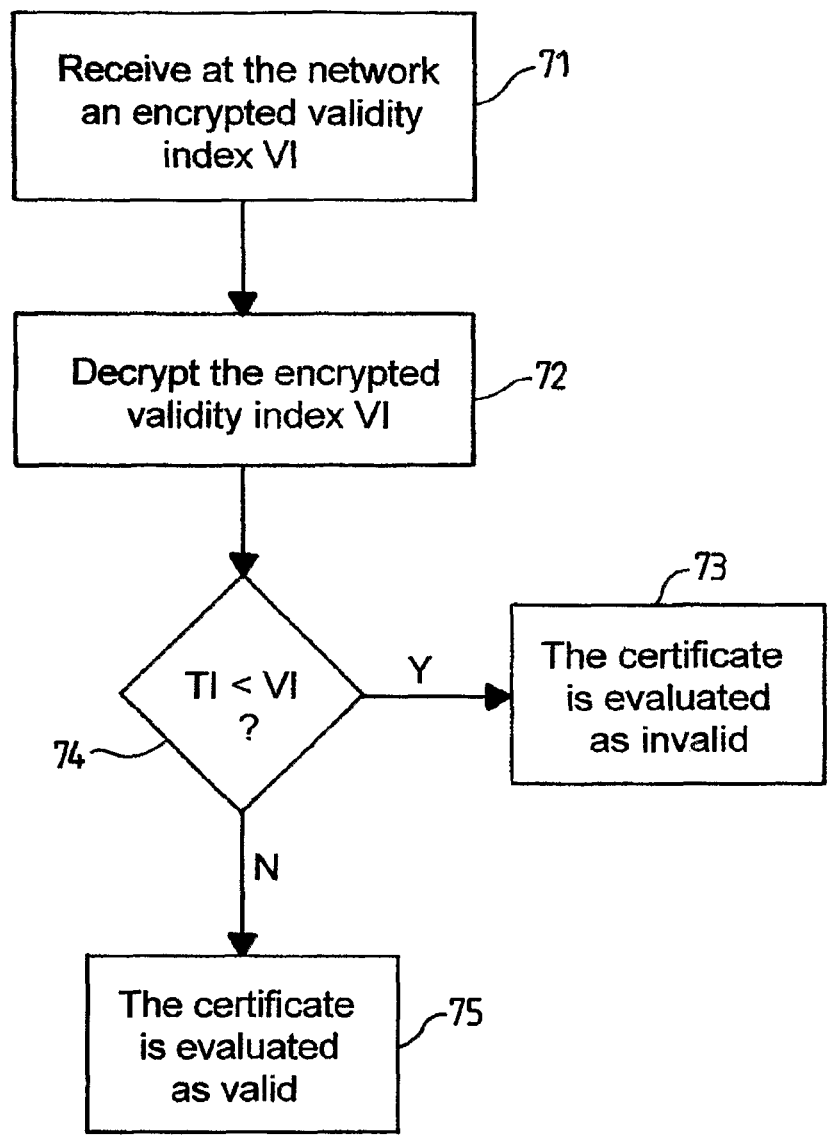
FIG. 7 illustrates an example of a method for checking a validity of a certificate according to a first embodiment of the present invention.

FIG. 7 illustrates an example of a method for checking a validity of a certificate according to a first embodiment of the present invention. The certificate is associated to a network device in a network.

An encrypted content is received at the network. An encrypted validity index associated to the encrypted content is received at the network (box 71). The received validity index is decrypted at decrypting means of the network (box 72).

Alternatively, the validity index VI is integrity protected such that a hacker cannot alter a value of the validity index VI without visible consequences. For example, an index signature is associated to the validity index, the index signature having a value that is computed from a value of the validity index and from a secret key stored at a secure device of the network. The secure device, e.g. a content receiver, comprises checking means, e.g. a portable security module, allowing to check an integrity of the validity index from the index signature. The value of the received validity index is scrambled with the secret key and subsequently compared to the associated index signature, which allows to detect an altering of the value of the validity index.

Alternatively, the validity index may both be encrypted and integrity protected, so as to allow to detect any attempt of a hacker, even ineffective.

The validity of the certificate is evaluated from the decrypted validity index VI and from a time index TI contained within the certificate. The time index TI has a value corresponding to a time of issue of the certificate. More precisely, the validity index VI is compared to the time index TI (box 74); the certificate is evaluated as valid (box 75) if the validity index VI is smaller or equal to the time index TI.

If the validity index VI is greater than the time index TI, it is considered that the certificate has expired: the certificate is evaluated as invalid (box 73).

Alternatively, the certificate is evaluated as valid only if the validity index VI equals to the time index TI. If the validity index VI is smaller than the time index TI, it is considered that the certificate is not valid yet, or that the encrypted content associated to the validity index VI are intended to users having old certificates only: in this latter case, the associated content may for example be an audiovisual message that encourages the users to buy new certificates. The certificate is hence evaluated as invalid if the time index and the validity index are different.

Figure 8:
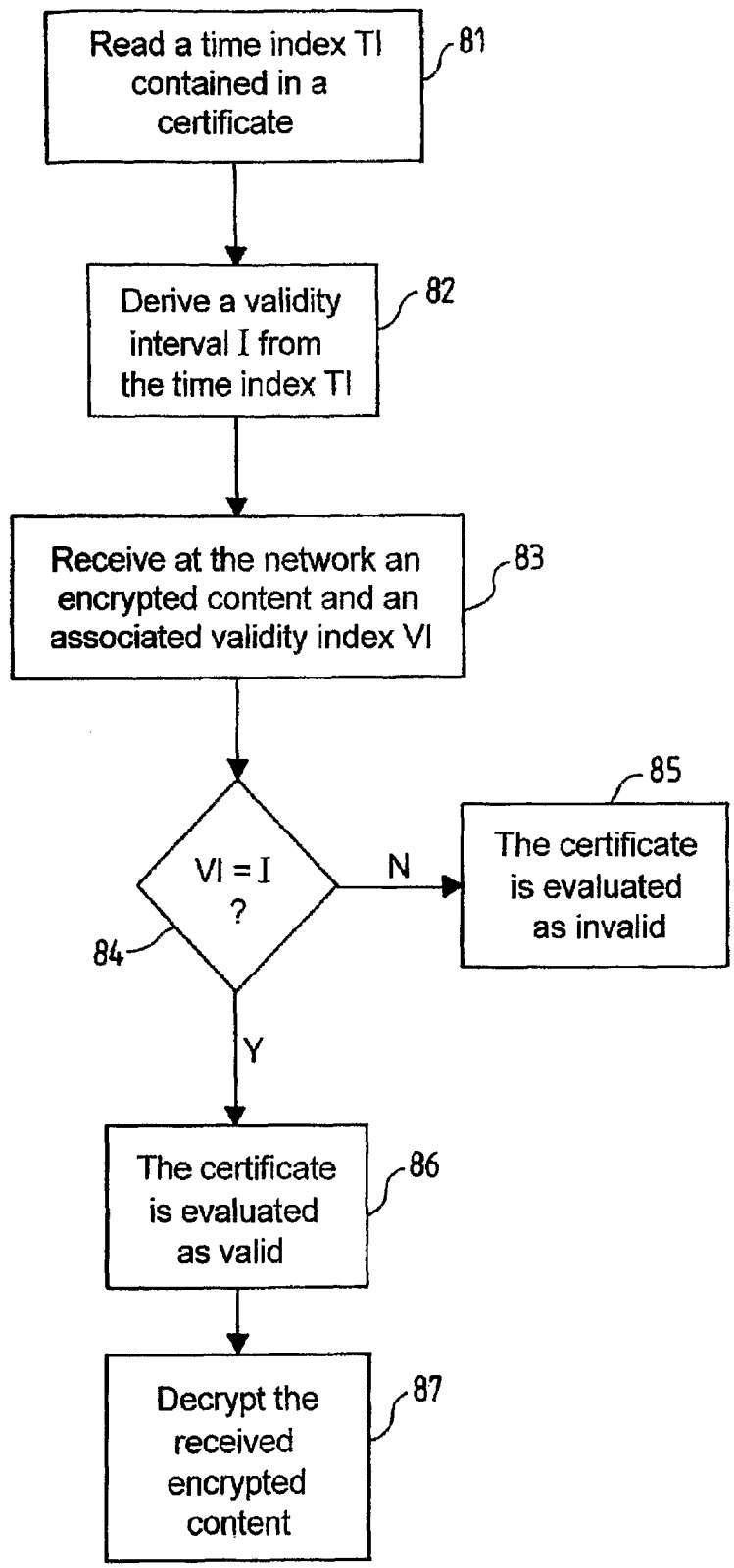
FIG. 8 illustrates an example of a method for checking a validity of a certificate according to a second embodiment of the present invention.

FIG. 8 illustrates an example of a method for checking a validity of a certificate according to a second embodiment of the present invention.

The certificate comprises a time index TI that has a value corresponding to a time of issue of the certificate, e.g. a date of a manufacturing of a hardware support of the certificate. The time index TI is read (box 81).

A validity interval I is derived from the read value of the time index TI (box 82).

The time index TI may be contained in an encrypted form within the certificate. In this latter case (not represented), the time index TI is decrypted before the deriving of the validity interval I.

When an encrypted content and an associated validity index VI are received at the network (box 83), the validity of the certificate is evaluated: the certificate is evaluated as valid if the received validity index VI belongs to the time interval I (box 86). If the received validity index VI is outside the time interval I, the certificate is evaluated as invalid (box 85).

If the certificate is evaluated as valid, the received encrypted content is decrypted (box 87).

The time interval may be semi-infinite: the time interval I may for example comprise any value smaller or equal to the value of the time index.

Alternatively, the time interval covers a finite range: for an example time index having a value equal to 100, the time interval I may comprise any value between 80 and 120. A network device associated to the certificate allows in this case to decrypt any encrypted content associated to a validity index greater than 80 and smaller than 120.

Figure 9:
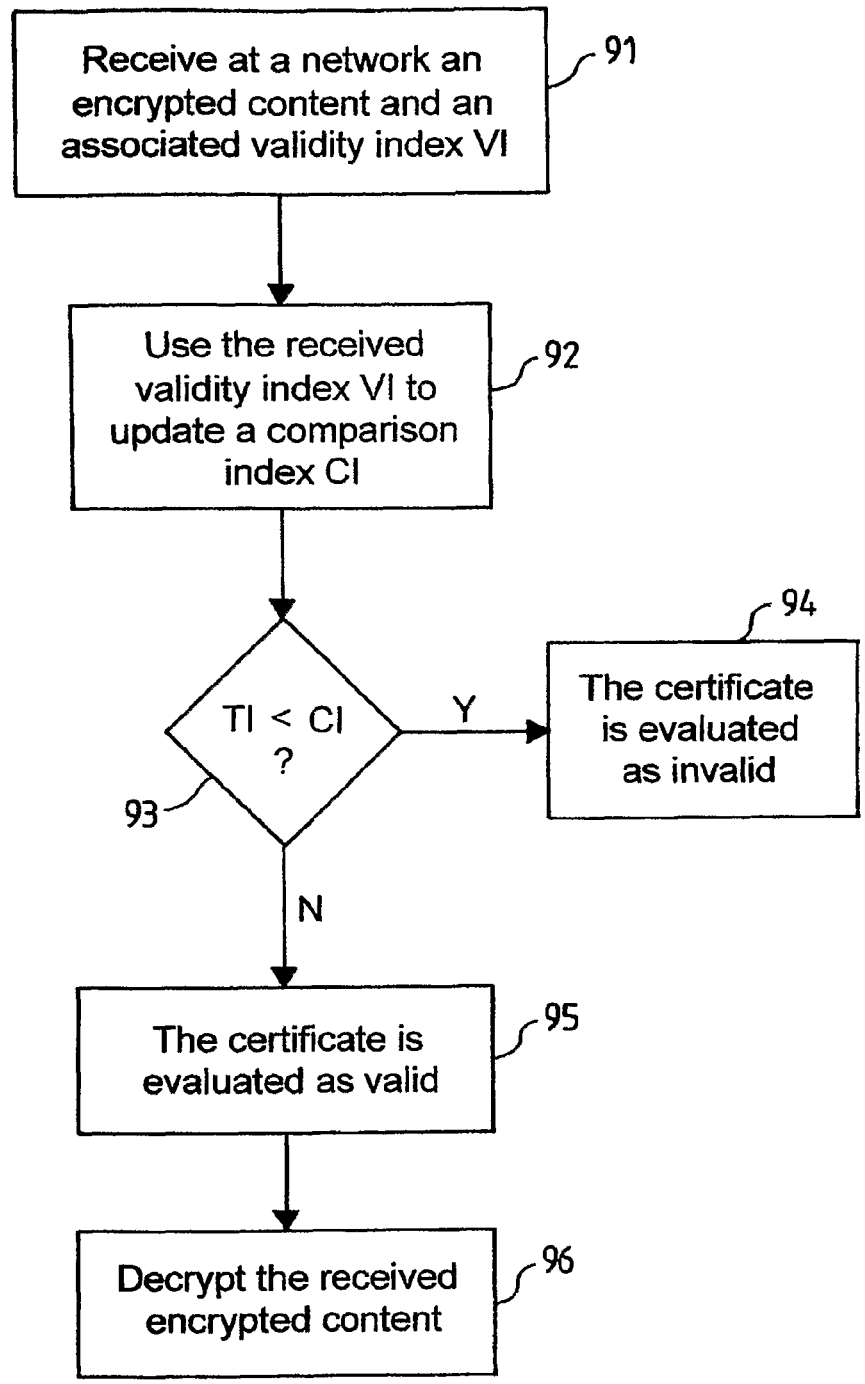
FIG. 9 illustrates an example of a method for checking a validity of a certificate according to a third embodiment of the present invention.

FIG. 9 illustrates an example of a method for checking a validity of a certificate according to a third embodiment of the present invention. The certificate is associated to a network device of a network.

An encrypted content and an associated validity index VI are received at a network (box 91). The received validity index is used to update a comparison index CI (box 92). The comparison index is stored within a determined network device of the network, e.g. the network device to which the certificate is associated.

The updated comparison index is compared to a time index TI contained within the certificate (box 93). The time index has a value that corresponds to a time of issue of the certificate. The validity of the certificate is thus evaluated 84 from the time index TI and from the validity index VI, the validity index VI only allowing to update a comparison index CI.

The certificate is evaluated as invalid if the time index TI is smaller than the updated comparison index (box 94). On the contrary, if the time index TI is greater or equal to the updated comparison index, the certificate is evaluated as valid (box 95). In this latter case, the received encrypted content is decrypted (box 96).

Figure 10:
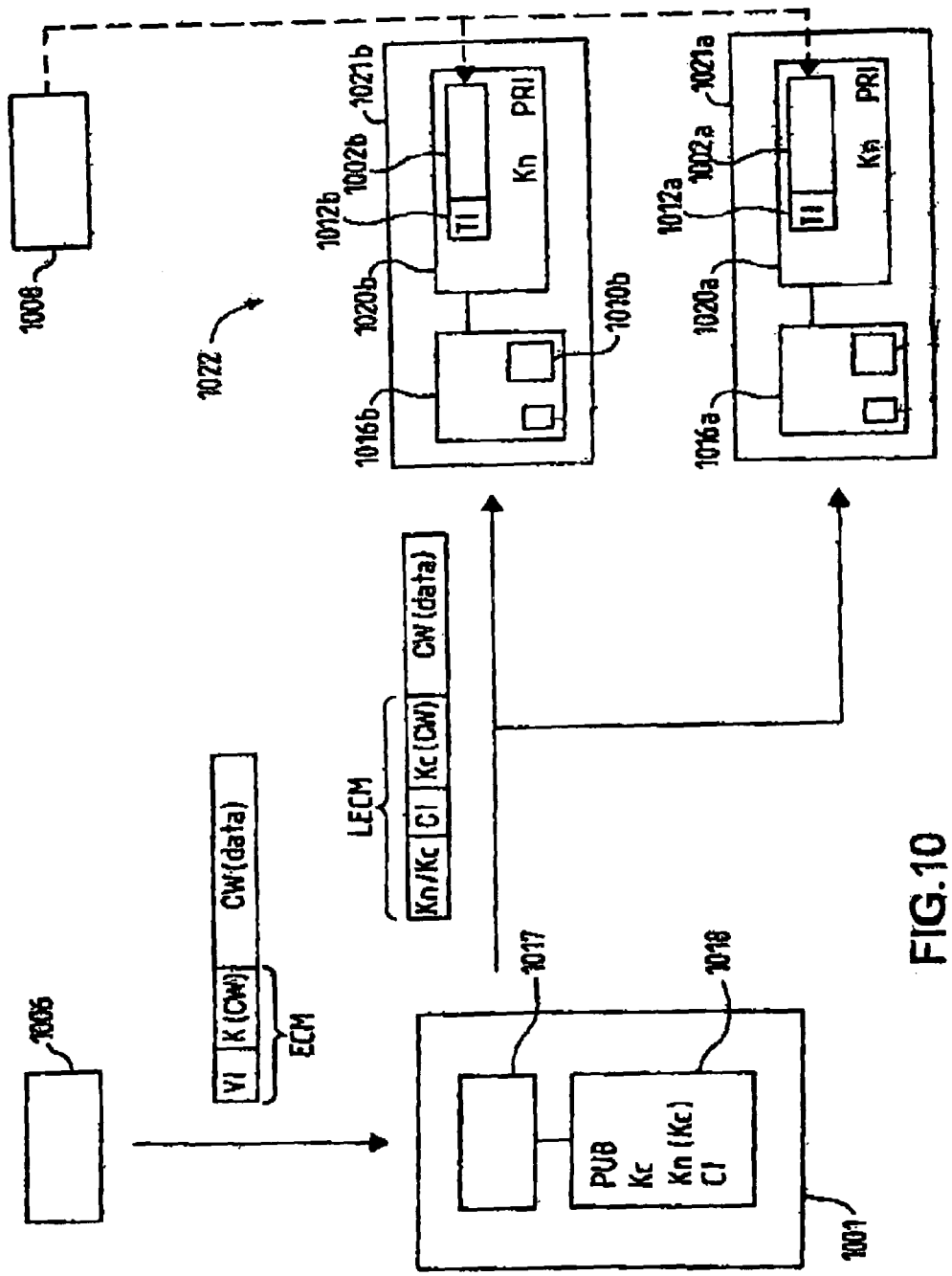
FIG. 10 illustrates an example of a secure communication network according to a fourth embodiment of the present invention.

FIG. 10 illustrates an example of a secure communication network according to a fourth embodiment of the present invention. The secure communication network comprises a content receiver 1001 and at least one terminal device (1021a, 1021b). Each terminal device (1021a, 1021b) is associated to a certificate (1002a, 1002b).

The content receiver 1001 allows to receive an encrypted content CW(data), e.g. encrypted pay television programs, from a content provider 1006, e.g. a broadcaster of pay television programs.

A plurality of terminal devices (1021a, 1021b) may be provided for a single content receiver 1001, thus allowing to form a local network 1022. The terminal devices (1021a, 1021b) of the local network 1022 typically comprise a content presentation device (1016a, 1016b) and a portable security module (1020a, 1020b) attached to the content presentation device (1016a, 1016b).

Each portable security module (1020a, 1020b) allows to store the associated certificate (1002a, 1002b) for the terminal device (1021a, 1021b). The portable security module (1020a, 1020b) may for example be a smartcard.

The content presentation devices (1016a, 1016b) may be television sets. The local network 1022 hence comprises television sets of a single owner. The encrypted pay television programs are received at the content receiver 1001 and are further transmitted to the television sets of the owner.

If a new television set 1016b is installed, a new smartcard 1020b is attached to the new television set 1016b. The smartcard 1020b allows to store the associated certificate 1002b. Under proper conditions, the certificate 1002b allows a new terminal device 1021b to acquire a symmetric network key Kn when installed. The symmetric network key Kn allows to secure data exchanges between the content receiver 1001 and the terminal devices (1021a, 1021b).

The validity of a new certificate 1002b attached to the new television set 1016b may be checked at the installing. Evaluating means 1010b allow to evaluate the validity of the new certificate 1002b from a broadcast validity index VI and from a time index 1012b of the new certificate 1002b. The time index 1012b has a value corresponding to a time of issue of the new certificate 1002b. The validity index VI is associated to the encrypted content CW(data) received at the content receiver 1001.

The validity index VI may be received at the content receiver 1001 in an encrypted form. The content receiver 1001 subsequently decrypts the validity index.

The validity index VI allows to update a comparison index CI stored in the content receiver 1001. For example, the updating consists in incrementing the comparison index CI with a value of the validity index. If the validity index has a value lower than zero, a value of the comparison index is decreased.

The updated comparison index CI is subsequently transmitted to the terminal devices (1021a, 1021b).

The updated comparison index CI may be scrambled at the content receiver, transmitted in a scrambled form (not represented on FIG. 10), and descrambled at the terminal devices.

Instead of comparing a starting date and an end date of the certificate to a current time furnished by a clock, as performed in Prior Art, the method of the present invention comprises comparing the time index 1012b to the comparison index CI.

If the time index TI is greater or equal to the comparison index CI, the new certificate 1002b is evaluated as valid.

If the time index TI is smaller than the comparison index CI, the certificate is evaluated as invalid and the new television set 1016b fails to be installed within the local network 1022.

Alternatively, a new television set having a smartcard with an invalid certificate may be accepted within the local network. At a further decrypting of the received pay television programs, the new television set may fail to access most of the pay television programs. Only free television programs and pay television programs associated to a comparison index CI having a value low enough, i.e. pay television programs intended to reach a large number of people, may be accessed at the television set.

Data exchanged between the content receiver 1001 and the terminal devices (1021a, 1021b) may be secured with a symmetric key Kc generated at the content receiver 1001.

The symmetric key Kc is preferably periodically renewed, for example on initiating each data transmission. The content receiver 1001 subsequently transmits each new symmetric key Kc to at least one terminal device (1021a, 1021b), the transmitted symmetric key Kc being scrambled with a public key PUB of the terminal device stored into a receiver portable security module 1018 of the content receiver 1001.

The terminal device (1021a, 1021b) descrambles the scrambled symmetric key Kc with an associated private key PRI stored in the portable security module (1020a, 1020b).

In the fourth embodiment, the validity of the certificate (1002a, 1002b) is evaluated before allowing any descrambling of the symmetric key Kc.

The evaluating means of the portable security module (1020a, 1020b) evaluate the validity of the certificate (1002a, 1002b) relative to the received content from the received validity index VI (transmitted by the content receiver with the scrambled key Kc) and from the time index (1012a, 1012b) inserted in the terminal device.

If the certificate (1002a, 1002b) is consider as valid, the terminal device is allowed to descramble the symmetric key Kc with the private key PRI. The terminal device (1021a, 1021b) subsequently re-scrambles the symmetric key Kc with the symmetric network key Kn acquired by each new terminal device at the installing of the new terminal device. The content receiver 1001 receives from the terminal device (1021*a*, 1021*b*) the re-scrambled symmetric key Kn(Kc). The symmetric key Kc is stored within the content receiver in the scrambled form Kn(Kc).

The receiver portable security module 1018 hence allows to store the public key PUB of a terminal device, the symmetric key Kc, the scrambled symmetric key Kn(Kc) and the comparison index CI.

In the illustrated embodiment, the encrypted content is broadcast from the content provider 1006, e.g. a satellite broadcaster, to the content receiver 1001. The content receiver 1001 receives a data stream that comprises the encrypted content CW(data), an Entitlement Control Message (ECM). The ECM comprises an encoded Control Word K(CW) and the validity index VI associated to the broadcast content. The Control Word allows to decrypt the encrypted content CW(data).

Alternatively, the validity index is transmitted in a second ECM that is distinct from an ECM containing the encoded Control Word.

The ECM is received at a decoder 1017 and is processed at the receiver portable security module 1018: the received encoded Control Word is decoded and is subsequently re-encoded with the symmetric key Kc. The content receiver 1001 transmits to at least one terminal device (1021*a*, 1021*b*) the re-encoded Control Word Kc(CW). The re-encoded Control Word may be contained within a Local Entitlement Control Message (LECM).

The content receiver 1001 also transmits to the at least one terminal device (1021*a*, 1021*b*) the encrypted content CW(data) and the scrambled symmetric key Kn(c). As illustrated in FIG. 10, the scrambled symmetric key Kn(Kc) may be transmitted within the LECM.

The content receiver may transmit the encrypted content CW(data), the re-encoded Control Word Kc(CW), the scrambled symmetric key Kn(Kc) and the comparison index CI to a single terminal device that subsequently communicates with other terminal device(s) of the local network. The communicating between the terminal devices of the local network may involve the symmetric network key Kn.

Alternatively, as illustrated in FIG. 10, the content receiver 1001 may communicate directly with all the terminal devices (1021*a*, 1021*b*) of the local network 1022.

As the symmetric network key Kn is stored within the portable security modules (1020*a*, 1020*b*), the terminal devices (1021*a*, 1021*b*) are allowed to descramble the symmetric key Kc. The encoded Control Word is subsequently decoded, thus allowing to decrypt the encrypted content CW(data).

For each received content, the associated comparison index VI allows to update the comparison index CI that is subsequently compared to the time index TI of the certificate (1002*a*, 1002*b*) of the terminal device (1021*a*, 1021*b*), thus allowing to estimate the validity of the certificate (1002*a*, 1002*b*) relative to the received content. If the certificate (1002*a*, 1002*b*) of a determined terminal device (1021*a*, 1021*b*) is estimated as expired, the determined terminal device fails to allow the decrypting of the received content.

The decrypting is preferably performed at the terminal devices (1021*a*, 1021*b*).

Preferably the secure communication network complies with the SmartRight standard.

The content received at the secure communication network may be encrypted following an MPEG-2 standard, or any other standard.

The certificates (1002*a*, 1002*b*) are signed by a certifying authority 1008. Typically the certificates (1002*a*, 1002*b*) are signed at a manufacturing of the attached smartcard (1020*a*, 1020*b*).

In the fourth embodiment, the validity index is received within the ECM comprising the encoded Control Word. Such ECM is typically broadcast every 10 seconds: the validity index is thus associated to a content representing 10 seconds of audiovisual information.

In an alternative embodiment (not represented), the content receiver receives ECMs containing only the encoded Control Word. The validity indices are received in Entitlement Management Messages (EMM). The validity indices allow to update the comparison index CI. The evaluating means subsequently compare the updated comparison index to the time index of the certificate. Typically, the EMMs are broadcast once a month: however, the EMMs may be broadcast with a higher frequency, in particular if a hacker succeeds in accessing the content.

Figure 11A:
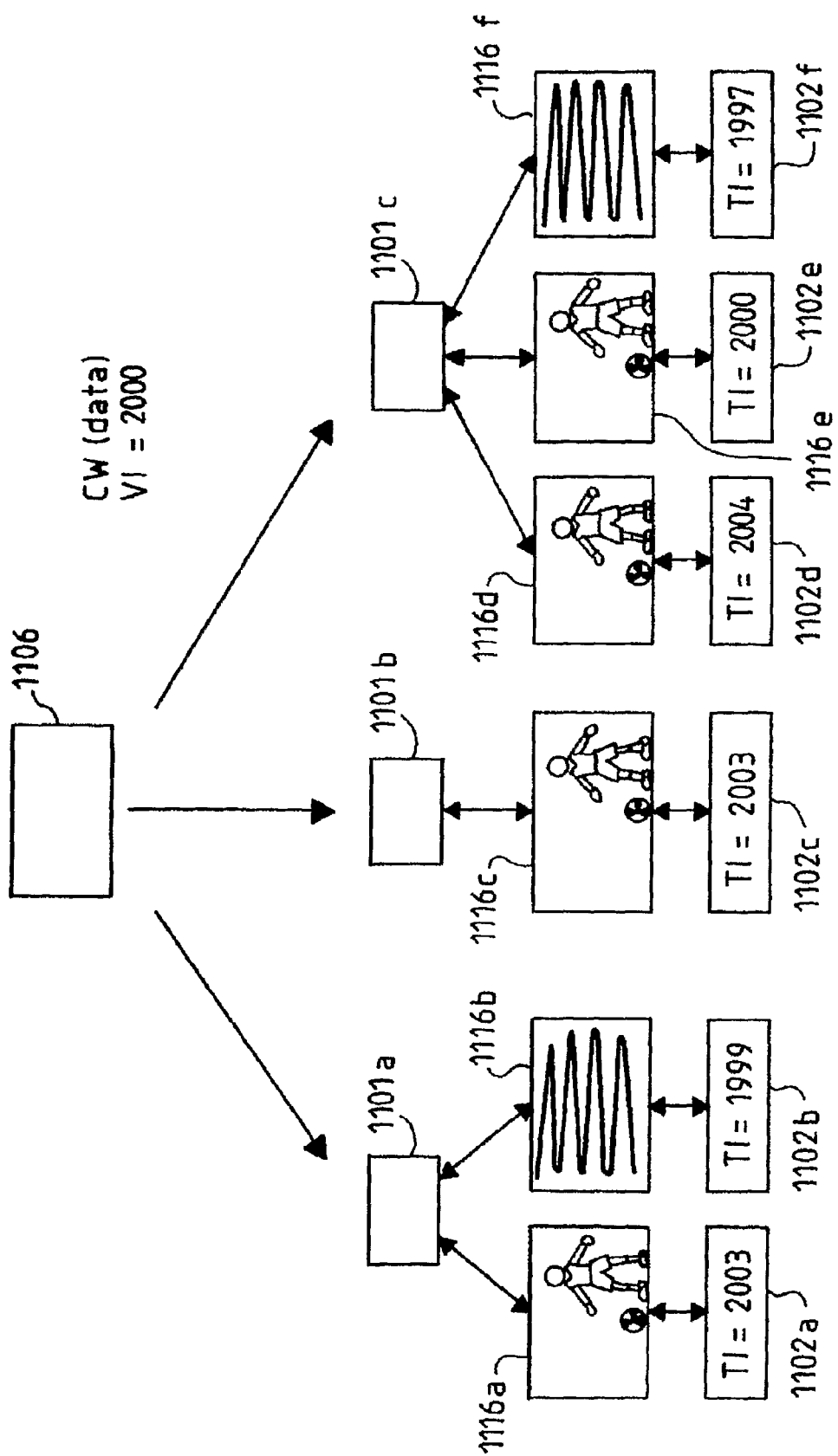
FIGS. 11A and 11B illustrate a broadcasting of a television program according to a fifth embodiment of the present invention.
Figure 11B:
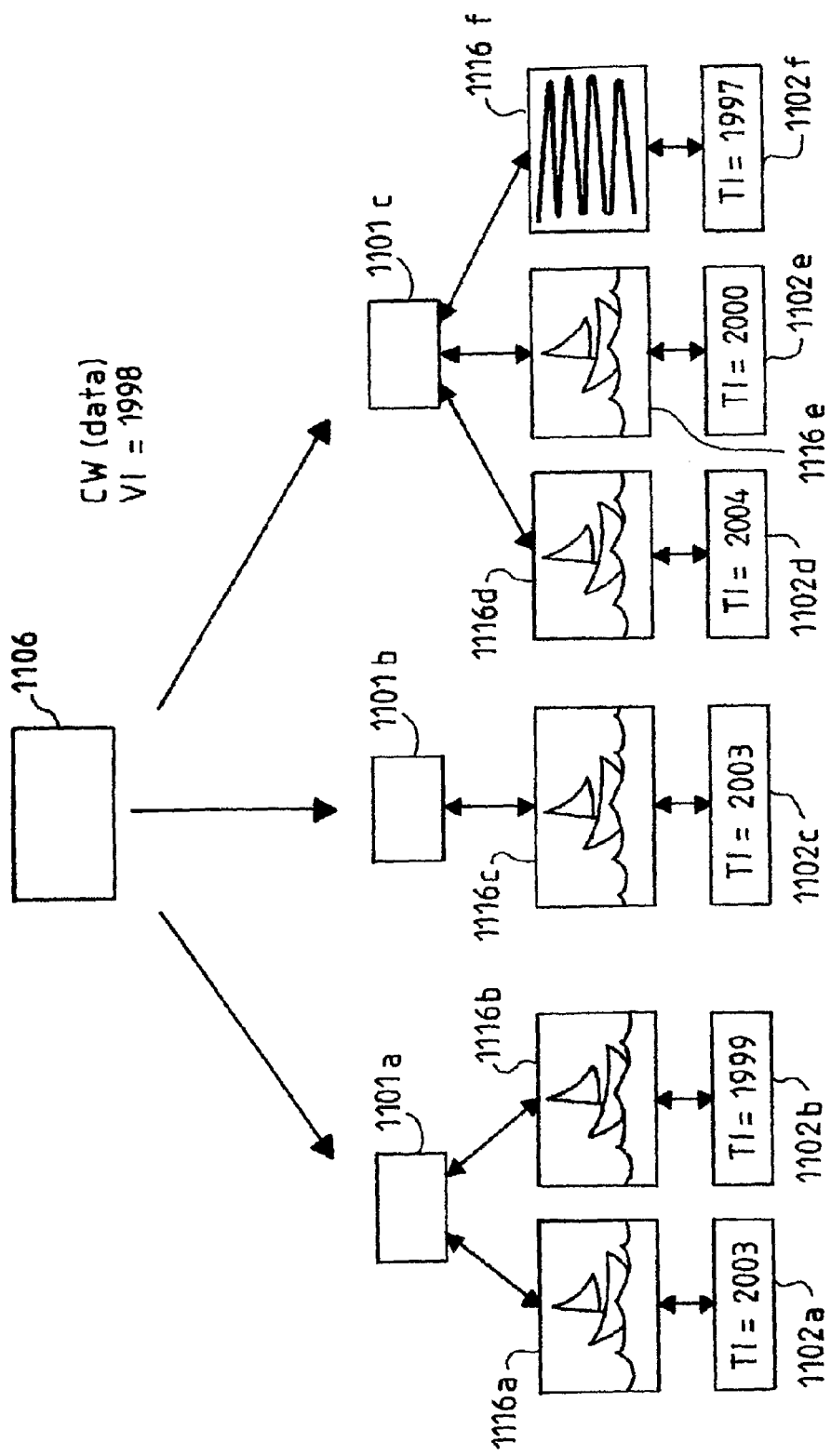

FIGS. 11A and 11B illustrate a broadcasting of a television program according to a fifth embodiment of the present invention.

A content provider 1106, e.g. a satellite broadcaster, broadcasts an encrypted television program CW(data) to a plurality of content receivers (101*a*, 1101*b*, 101*c*). Under proper conditions, each content receiver (1101*a*, 1101*b*, 1101*c*) belongs to a subscriber.

Each content receiver (1101*a*, 1101*b*, 1101*c*) communicates with at least one television set (1116*a*, 1116*b*, 1116*c*, 1116*d*, 1116*e*, 1116*f*). A single subscriber may possess a plurality of television sets: for example, the television sets 1116*a* and 1116*b* belong to a single subscriber.

A certificate (1102*a*, 1102*b*, 1102*c*, 1102*d*, 1102*e*, 1102*f*) is associated to each television set (1116*a*, 1116*b*, 1116*c*, 1116*d*, 1116*e*, 1116*f*). The certificates (1102*a*, 1102*b*, 1102*c*, 1102*d*, 1102*e*, 1102*f*) comprise a time index TI that corresponds to a time of issue of the certificate (1102*a*, 1102*b*, 1102*c*, 1102*d*, 1102*e*, 1102*f*). In the example illustrated in FIG. 11A and FIG. 11B, the value of a time index equals a year of a manufacturing of the associated smartcard, e.g. 2003.

If, as illustrated in FIG. 11A, the broadcast encrypted television program is associated to a validity index having a value equal to 2000, the certificates (1102*b*, 1102*f*) containing a time index having a value smaller than 2000 are evaluated as invalid. The associated television sets (1116*b*, 1116*f*) fail to decrypt the encrypted television programs. The corresponding subscribers need to replace the smartcards (1102*b*, 1102*f*) to access the television programs.

The method of the present invention allows to broadcast an encrypted television program with an associated validity index having a lower value than expected, as illustrated in FIG. 11B. If the broadcast validity index has a value equal to 1998, the certificates (1102*a*, 1102*b*, 1102*c*, 1102*d*, 1102*e*) containing a time index having a value higher than 1998 are evaluated as valid. The associated television sets (1116*a*, 1116*b*, 1116*c*, 1116*d*, 1116*e*) are allowed to access the broadcast television programs.

The method of the present invention hence allows to reach a large number of people, e.g. former subscribers having old smartcards, by broadcasting a validity index having a relatively low value. The validity index associated to a determined television program is preselected according to the television sets the television program is intended for.

The system of the present invention also allows a former subscriber possessing only an old smartcard to view an old recorded content.

By "validity" of a certificate, we mean a time validity of the certificate. A certificate evaluated as valid may contain a public key that fails to allow any communicating with other network devices.

The present invention also comprises any combination of the embodiments described in the present description.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for decrypting encrypted data by a network device in a network, the data allowing decryption of an encrypted content, the network device storing a certificate containing a key associated to the network device in the network, the method comprising, in the network device:
   receiving the encrypted data and a validity index associated to the content;
   evaluating, without reference to a clock, a time validity of the certificate using a time index contained within the certificate, and the validity index associated to the encrypted content, the time index having a value corresponding to a time of issue of the certificate; and
   decrypting the encrypted data only when the certificate is evaluated to be valid.

2. The method of claim 1, wherein the validity index is received together with the associated content.

3. The method of claim 1, wherein the validity index is received in an encrypted form; the method further comprising decrypting at the network the encrypted validity index.

4. The method of claim 1, wherein the validity index is integrity protected.

5. The method of claim 1, further comprising evaluating the certificate as invalid if the validity index is greater than the time index.

6. The method of claim 1, further comprising deriving a validity interval from the time index; evaluating the certificate as invalid if the validity index is outside the derived validity interval.

7. The method of claim 1, further comprising updating a comparison index using the received validity index, the comparison index being stored within a determined network device of the network; comparing the updated comparison index to the time index to evaluate the validity of the associated certificate.

8. The method of claim 7, wherein the evaluating is performed when a new network device is installed within the network.

9. The method of claim 1, further comprising receiving at a content receiver of the network the encrypted content and the associated validity index; transmitting the received encrypted content and the associated validity index to at least one terminal device of the network.

10. The method of claim 9, further comprising
receiving at the content receiver an Entitlement Control Message associated to the encrypted content, the Entitlement Control Message comprising an encoded Control Word, the Control Word allowing to decrypt the encrypted content;
decoding the received Control Word at the content receiver;
re-encoding the decoded Control Word with a symmetric key;
transmitting the re-encoded control word to the at least one terminal device.

11. The method of claim 10, further comprising
periodically renewing the symmetric key at the content receiver;
scrambling the new symmetric key with a public key;
transmitting the scrambled symmetric key to at the least one terminal device;
descrambling at the terminal device the scrambled symmetric key using a private key corresponding to the public key;
scrambling the descrambled symmetric key with a symmetric network key;
transmitting the scrambled symmetric key to the content receiver;
storing the scrambled symmetric key the content receiver;
transmitting the scrambled symmetric key with the re-encoded Control Word, from the content receiver to at least one terminal device;
decoding the re-encoded Control Word with the symmetric key at the terminal device if the certificate associated to the terminal device is evaluated as valid; and
decrypting the encrypted content with the decoded Control Word.

12. The method of claim 1, wherein: the encrypted content is an encrypted pay television program.

13. A system for decrypting encrypted data allowing decryption of an encrypted content, the system comprising:
   a network device storing a certificate containing a key associated to the network device, the network device being configured to:
   receive the encrypted data and a validity index associated to the content;
   evaluate, without reference to a clock, a time validity of the certificate using a time index of the certificate and the validity index associated to the encrypted content, the time index having a value corresponding to a time of issue of the certificate; and
   decrypt the encrypted data only when the certificate is evaluated to be valid.

14. The system of claim 13, wherein: the validity index is integrity protected.

15. The system of claim 13, wherein the validity index is received in an encrypted form; the system further comprising decrypting means to decrypt the encrypted validity index.

16. The system of claim 13, further comprising: at least one terminal device of the network, each terminal device being associated to one certificate.

17. The system of claim 16, wherein each terminal device comprises:
   a content presentation device;
   a portable security module attached to the content presentation device, the certificate associated to the terminal device being stored within the portable security module.

18. The system of claim 17, wherein:
the content receiver also receives an encoded Control Word;
the content receiver comprises a decoder to receive the encrypted content;
a receiver portable security module attached to the decoder to process the received encoded Control Word.

19. The system of claim 17, wherein
the content provider is a broadcaster of pay television programs; each content presentation device is a television set.

\* \* \* \* \*